UNITED STATES PATENT OFFICE.

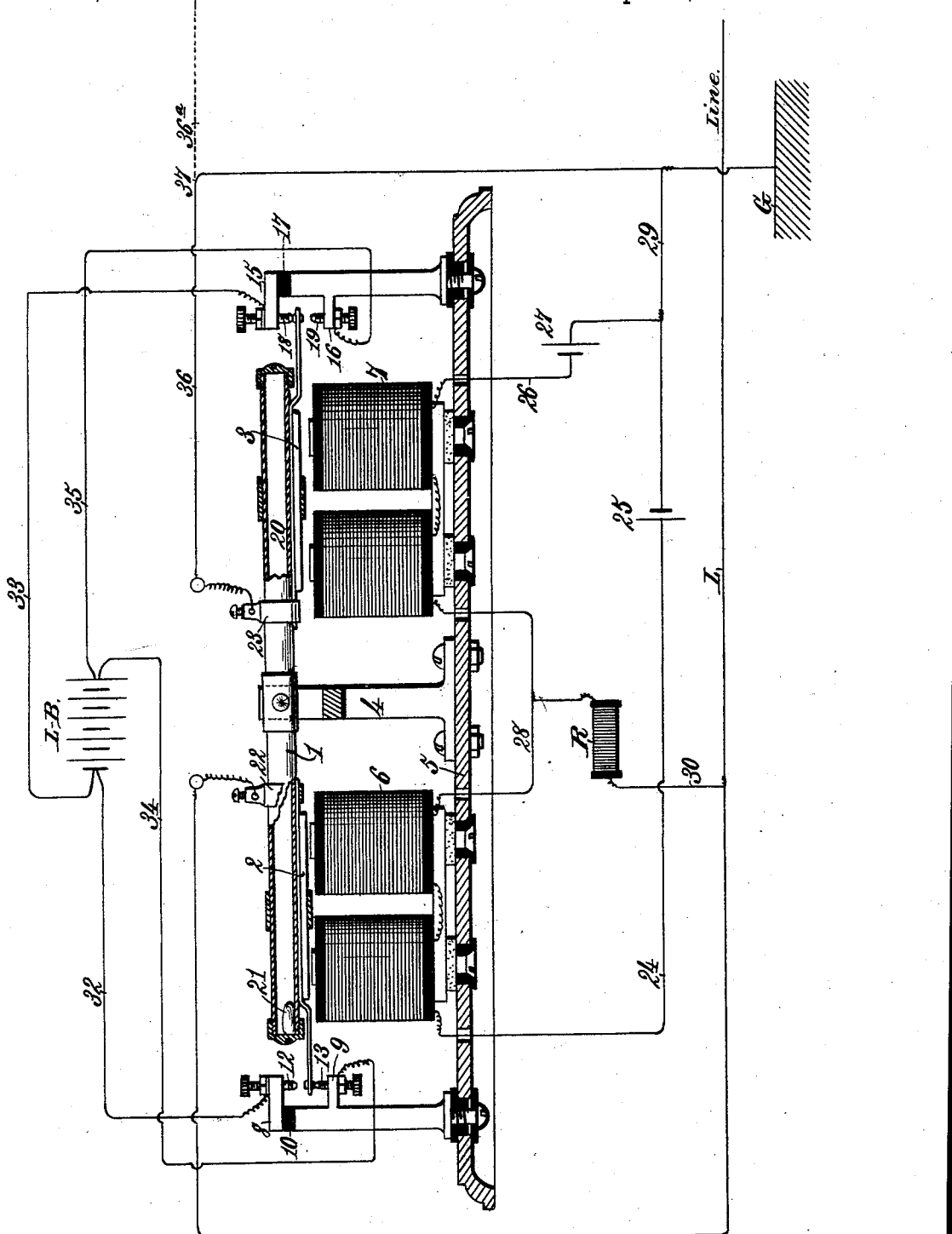

PAUL MINNIS, OF MOBILE, ALABAMA, ASSIGNOR OF ONE-HALF TO THE HOME TELEPHONE COMPANY, OF SAME PLACE.

AUTOMATIC BATTERY-REVERSER.

SPECIFICATION forming part of Letters Patent No. 557,854, dated April 7, 1896.

Application filed February 17, 1896. Serial No. 579,653. (No model.)

*To all whom it may concern:*

Be it known that I, PAUL MINNIS, a citizen of the United States, residing at Mobile, in the county of Mobile and State of Alabama, have invented new and useful Improvements in Automatic Battery-Reversers for Telegraph-Lines, of which the following is a specification.

My purpose is to provide an automatic battery-reverser for telegraph-lines whereby the reversal, whether by accident or otherwise, of a battery at either end of a line or an intermediate battery in series with a line having other batteries in series therewith will cause corresponding reversal to take place automatically in all batteries in series with that line.

My invention is applicable not only to telegraph-lines, but to other systems, and may be used either in connection with primary batteries, dynamos, or any polarized generators of electric energy.

It consists in the novel features, parts, and combinations of parts hereinafter fully explained, and then particularly pointed out and defined in the claims which complete this specification.

To enable those skilled in the art to which my said invention pertains to clearly comprehend and practice the same, I will proceed to describe said invention in detail, reference being had for this purpose to the accompanying drawing, in which the figure shows my reversing apparatus in vertical section, together with a diagram of the circuits.

The apparatus shown in the drawing is duplicated at each of the local stations or offices upon a telegraph-line or series of connected lines or other system employing conductors for electricity supplied from polarized generators, such as primary batteries or dynamo-machines. It consists, essentially, of a balanced armature having a central portion 1, formed of insulating material, and the two ends 2 and 3, of conducting metal. The armature is balanced pivotally upon a post 4, which rises from a base-plate 5. Beneath the conducting portion 2 are arranged electromagnets 6, properly insulated from the base, and beneath the other conducting portion 3 are arranged independent electromagnets 7, also insulated from the base.

Beneath the extremity of the armature portion 2 rises a post, upon which are mounted two contact-pieces 8 and 9, separated electrically by an insulation 10 and arranged one above the other, so that the point or extremity of the armature may vibrate between them and engage alternately with conducting-points 12 and 13, mounted on said contact-pieces 8 and 9, respectively. At the opposite end of the armature is a similar post having contact-pieces 15 and 16, separated by an insulation 17 and provided with conducting-points 18 and 19.

Upon the armature is mounted a glass tube 20, projecting equally on both sides of the pivotal support on the post 4. In said tube, which is closed at both ends, is a globule of mercury 21, free to run to either end of the tube as the latter is inclined by the movements of the armature in response to the attraction of the magnets 6 or 7. By its shifting to either end of the tube it maintains the armature in the position to which it has been drawn by one or the other of said magnets after current has ceased to flow through the magnet-helices. When at either end of the said tube, also, it preserves the electrical engagement of the corresponding end of the armature with one of the lower conducting-points 13 or 19 and holds the opposite end against one of the upper points 12 or 18.

The glass tube 20 may be mounted on the armature in any suitable manner, a convenient construction being to inclose it within two clasps 22 and 23, which are connected to the conducting ends 2 and 3 of the armature.

The second terminal of the electromagnets 6 is connected by a wire 24 to the zinc or positive pole of a battery 25, and the second terminal of the magnets 7 is connected by a wire 26 to the carbon or negative pole of a battery 27. The first terminals of said magnets 6 and 7 are connected to a spread or common terminal 28. The two batteries 25 and 27 have their carbon and zinc poles, respectively, connected by a wire 29 to earth at G.

The line-wire L entering the station has a shunt 30, connected to the common terminal 28, a resistance-coil, rheostat, or "choke-coil" R being interposed, so that a suitable portion of the current upon the line may pass to the spread terminal 28 and thence to the first terminal of the magnets 6 or 7. The line-wire is connected to a binding-post upon the metal clasp 22, and is therefore in electrical communication with the conducting portion 2 of the armature.

The conducting-piece 8 connects by a wire 32 with the carbon or negative pole of a line-battery L B, and said pole is also connected by a wire 33 to the contact-piece 15 at the opposite end of the armature. The positive or zinc pole of the line-battery is connected by a wire 34 to the contact-piece 9 and by a wire 35 to the contact-piece 16. The earth connection 29 has connection also with a wire 36 from a binding-post on the clasp 23, which is in electrical communication with the conducting part 3 of the armature.

The operation of the parts is as follows: If the current entering the station comes from the carbon or negative pole of a line-battery, it will pass over the wire L, giving off a portion to the shunt 30, through the rheostat R, to the spread terminal 28. From this terminal it cannot flow through the helices of the magnets 7, since the derived current being from a negative pole on the line it is opposed by the carbon pole of battery 27. It passes, therefore, through the helices of the magnets 6, over wire 24, to the zinc pole of battery 25, and thence by wire 29 to earth. The part 2 of the armature being thus attracted is drawn down upon the conducting-point 13, and this position is maintained by the globule of mercury 21, which passes instantly to that end of the tube 20. The circuit for the line is then by way of the clasp 22, part 2 of the armature, conducting-point 13, contact-piece 9, and wire 34 to the zinc pole of battery L B; from the carbon pole of this battery by wire 33 to contact-piece 15, conducting-point 18, portion 3 of the armature, clasp 23, and thence by wire 36 to earth. If now the current upon the line-wire is reversed in polarity, or taken from the zinc pole of the line battery, it passes in the same way to the armature part 2, giving off a portion to the shunt-wire 30. This derived current cannot flow through the helices of magnets 6, as it is opposed by the zinc pole of battery 25, and it therefore passes through the coils of magnets 7 to the carbon pole of battery 27, and from the zinc pole of the latter to earth over wire 29. The armature portion 3 being thus attracted is drawn down upon the point 19 and held there by the mercury, which is now shifted to the adjacent end of the tube 20. The path of the current is then as follows: from the line-wire L to binding post or clasp 22, armature part 2, conducting-point 12, contact-piece 8, wire 32 to the carbon pole of battery L B; from the zinc pole of that battery over wire 35, contact-piece 16, conducting-point 19, armature part 3, clasp 23, and wire 36 to earth. It will readily be seen that in this manner a change in the polarity of the current on the line entering a station will instantly be followed by a corresponding change, through the instrumentality of my invention, in the polarity of the current from the battery L B.

Upon a system including a series of connected lines, such as are frequently coupled together for long-distance telephones, for telegraphing and other purposes, having, besides the batteries at either end of the circuit, intermediate batteries in series with the line at one or more points, the reversal of any battery connected in series with the line, whether occurring by accident or intention, will be followed instantly by an automatic corresponding reversal of every battery included in the line. The importance of obtaining this result by means which are wholly automatic in action, and which have practically instantaneous operation, and the value of an apparatus of simple construction which is certain and accurate in its action, are matters well understood by those familiar with the art.

In the case of an intermediate battery the wire 36, instead of going to earth by way of wire 29, forms the other end of the main line, as shown from point 37 by dotted lines 36ª.

It is evident that the reversing apparatus may be used without any modification upon lines where current is generated by dynamos or other generators.

What I claim is—

1. An automatic battery-reverser, consisting of a balanced armature having a tube containing a fluid globule, electromagnets under each end of the armature, said ends being of conducting metal and separated by a central insulating portion, a common terminal connected to the first terminals of both said magnets, independent batteries one connected from its positive and the other from its negative pole to the second terminals of said magnets, and having a common connection to earth, opposite, insulated contacts between which each end of the armature vibrates, a line-battery having its poles connected to said contacts at one end and correspondingly connected to the contacts at the other end of said armature, a line-wire connected to one insulated end of the armature and by a shunt having a rheostat to the common terminal of the electromagnets and a connection to earth from the other end of said armature, substantially as described.

2. An automatic battery-reverser, comprising a balanced armature having its conducting ends electrically isolated from each other, electromagnets to attract said ends, a line-wire connected to one end of the armature, a shunt from the line to the first terminals of said magnets, a rheostat in said shunt, two independent batteries having their negative and positive poles connected to the two second terminals of the magnets, one to each, and having an earth connection, a line-battery having its poles correspondingly connected to insulated contact-pieces between which the ends of the armature vibrate, and a connection from one end of the said armature to the line-wire, and from the other end to earth, substantially as described.

3. An automatic battery-reverser consisting of a two-part, balanced armature, having one part connected to a line-wire and the other to earth, magnets to attract the ends of said armature and deriving current through a shunt from the line, two batteries having the negative pole of one and the positive pole of the other connected to the second terminals of the magnets, one to each and a line-battery having its opposite poles correspondingly connected to contacts between two of which each end of the armature vibrates, substantially as described.

4. In automatic battery-reversers, the combination with a balanced armature having conducting ends, of electromagnets arranged beneath said ends, independent circuits for said magnets, and a tube of insulating material, such as glass, mounted on the armature and containing a globule of mercury, substantially as described.

In testimony whereof I have hereunto set my hand in presence of two subscribing witnesses.

PAUL MINNIS.

Witnesses:
CLAYTON B. CLARK,
WILLIAM H. SULLIVAN.